March 22, 1949.  F. E. PAYNE  2,464,988

SINGLE CONVOLUTION RUBBER SEALING ELEMENT

Filed April 25, 1947

INVENTOR
Frank E. Payne
BY
Charles P. Vyztek
atty.

Patented Mar. 22, 1949

2,464,988

UNITED STATES PATENT OFFICE 2,464,988

SINGLE CONVOLUTION RUBBER SEALING ELEMENT

Frank E. Payne, Glencoe, Ill.

Application April 25, 1947, Serial No. 743,824

4 Claims. (Cl. 286—11)

This invention relates to fluid sealing devices for rotary pumps or the like and particularly to a tubular flexible bellows sealing element which is an essential part of such sealing devices.

The principal object of this invention is to provide a flexible bellows for a fluid sealing device wherein the fold of the bellows flexes in an extremely uniform and controllable manner.

A more specific object of this invention is to provide a flexible bellows for a fluid sealing device or the like wherein the bellows comprises a tube having a single fold, the fold being comprised of a diaphragm connected to a conical section of the tube to form an asymmetrical V. As the fold is contracted, the diaphragm becomes conical and the initially conical section telescopes into the diaphragm.

Figure 1:
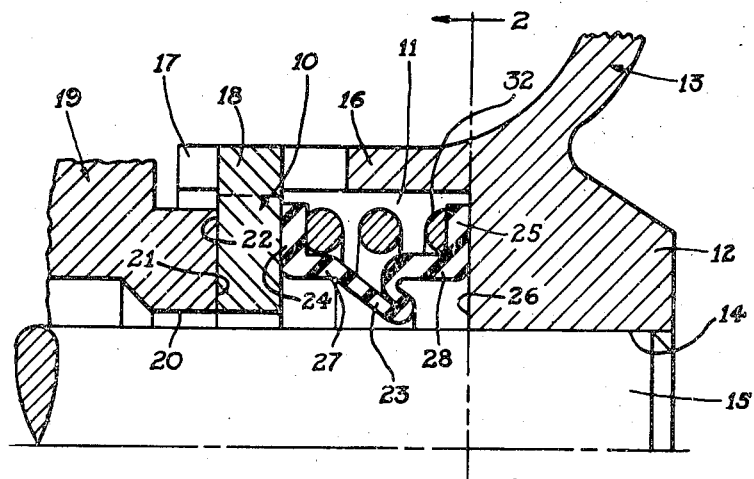
Figure 2:
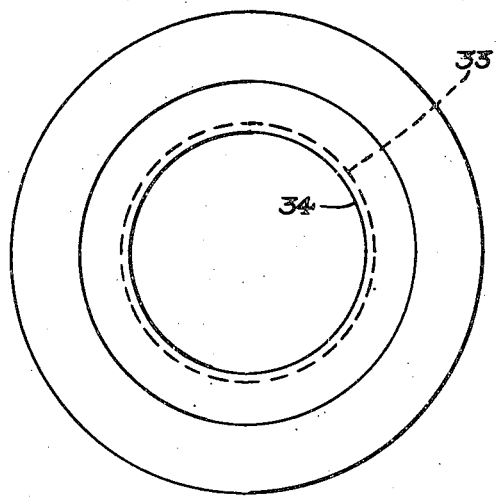
Figure 3:
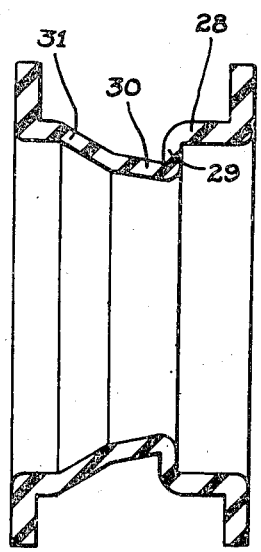

These and other objects of this invention will become apparent from the following detailed description when taken together with the accompanying drawings, in which Fig. 1 is a quarter section through a fluid seal in which the bellows of this invention is incorporated, the seal being shown installed in a water pump;

Fig. 2 is an end view of the seal looking to the left from line 2—2 of Fig. 1; and Fig. 3 is a section through a bellows of this invention showing the bellows as it is molded or otherwise formed initially.

Referring now to the drawings and particularly to Fig. 1 thereof, there is shown a mechanical seal for a water pump or the like, the seal comprising a rigid sealing washer 10 made of non-friction material such as a thermosetting resin having interspersed therein powdered metal such as antimony, tin and lead together with asbestos fiber and graphite. The washer 10 is positioned within a cup-shaped recess 11 formed in the hub 12 of a vaned impeller 13, said impeller having a central opening 14 by which it is press-fitted upon a shaft 15 so as to be driven thereby. The cylindrical wall 16 of the recess has a plurality of slots 17 into which extend ears 18 formed on the outer periphery of washer 10. Thus washer 10 is constrained to rotate with impeller 13.

The fluid to be sealed, in this case water, is located exteriorly of impeller 13 and in a chamber defined in part by a housing 19, only a fragmentary part of which is shown. Housing 19 has an opening 20 through which shaft 15 passes freely, and a radially disposed surface 21 which is finished either by a very fine lathe cut or by grinding so as to be flat and smooth. A similarly finished surface 22 on washer 10 contacts surface 21 to form a fluid-tight seal therebetween.

Washer 10 is sealed with respect to impeller 13 by a tubular flexible deformable sealing element 23 preferably made of rubber, natural or synthetic, or a combination of the two. Sealing element 23 is comprised of spaced flanges 24 and 25 abutting on the back of 10 and the radial surface 26 of recess 11, respectively; and substantially cylindrical sections 27 and 28 connected by a fold. The fold is of special, non-symmetrical shape as shown in Fig. 3. It is comprised of a radial section 29 which is joined to a section having a double taper 30 and 31. The difficulty with a symmetrical fold is that the apex moves radially inwardly and may at times touch the shaft. If the symmetrical fold is compressed beyond the point where the two halves touch, the apex then assumes an unpredictable non-circular irregular shape. This unpredictable action detracts from the smooth compressibility of the bellows and should it be used in a seal in which the shaft rotates relative to the bellows, the apex may touch the rotating shaft at one or more places and quickly wear through.

The cylindrical sections 27, 28 are thicker than the fold so as to render the cylindrical sections substantially rigid and hence limit the flexing action to the fold.

In the present design, the radial part 29 acts as a diaphragm and swings axially as the bellows is compressed. The apex may move into the cylindrical part 28 for quite a distance before the two cylindrical sections touch and impose irregular stresses on the fold.

Since the tapered portion of the fold is quite long it is possible that it would not bend radially inwardly when under compression. To insure that the tapered portion flexes properly, it is given a double taper or starting bend in the direction that it is desired to go. A portion of the first tapered section 30 is utilized to form the apex as the fold is compressed, the material from section 30 being bent as the portion previously forming the apex is straightened and added to the radial portion 29.

The sealing element is shown in its compressed, normal working condition in Fig. 1. The apex of the fold is clearly shown moved within the cylindrical part 28. A spring 32 is compressed between flanges 24 and 25 and serves to hold the flanges in sealing engagement with the washer and the wall 26 of recess 11. When the apex is in the position shown in Fig. 1, the inside diameter of the apex is reduced, but the apex is still of a perfectly circular form in a radial plane. Fig. 2 shows in dotted line 33 the diameter and shape of the apex when the sealing element is relaxed as in Fig. 3 and in solid line 34 the diameter and shape of the apex when the bellows is compressed as in Fig. 1. In both conditions, the apex is perfectly round.

It is understood that the fold in the sealing element 23 may be inverted from the position shown and changes may likewise be made in the size and angularity of the fold, all without departing from the scope of this invention.

What is claimed is:

1. A flexible sealing device comprising a tube having a fold intermediate the ends thereof, said fold being comprised of a substantially radially disposed section connected to a tapered section and a second tapered section of a different taper from the first connected to the said first tapered section.

2. A flexible sealing device comprising a tube adapted to fold intermediate the ends thereof, said device being comprised of a cylindrical section, a substantially radially disposed section connected to the cylindrical section, a tapered section spaced from the radially disposed section, and a section intermediate the tapered section and the radially disposed section and adapted to be telescoped into the cylindrical section and thereby effect a folding of the tube.

3. A flexible sealing device comprising a tube adapted to fold intermediate the ends thereof, said device comprising a cylindrical section located near one end of the tube, a substantially radially inwardly disposed section connected to the cylindrical section, an outwardly tapered section spaced from the radially inwardly disposed section, and a section connecting the tapered section to the radially disposed section, said last-mentioned section being telescoped into the cylindrical section as the device is folded.

4. A flexible sealing device comprising a tube having radially disposed flanges at the ends thereof, cylindrical portions extending from the flanges, and a fold connecting the cylindrical portions, said fold being comprised of a radially disposed section, a tapered section spaced from the radially disposed section, and a section intermediate the tapered section and the radially disposed section and adapted to be telescoped into the cylindrical section and thereby effect a folding of the tube.

FRANK E. PAYNE.

REFERENCES CITED

The following references are of record in the file of this patent:

UNITED STATES PATENTS

| Number | Name | Date |
|--------|------|------|
| 2,027,505 | Winkler | Jan. 14, 1936 |
| 2,394,012 | Rayburn | Feb. 5, 1946 |
| 2,408,909 | Brummer | Oct. 8, 1946 |
| 2,432,684 | Roshong | Dec. 16, 1947 |